UNITED STATES PATENT OFFICE.

SAMUEL SCHEIBLER AND ADOLF SCHEIBLER, OF MEMPHIS, TENNESSEE.

EXTRACTING OIL FROM COTTON-SEED.

SPECIFICATION forming part of Letters Patent No. 281,566, dated July 17, 1883.

Application filed April 25, 1883. (No specimens.)

*To all whom it may concern:*

Be it known that we, SAMUEL SCHEIBLER and ADOLF SCHEIBLER, both of Memphis, in the county of Shelby and State of Tennessee, have invented a new and useful Improvement in Extracting Oil from Cotton-Seed, of which the following is a description.

Our invention consists of preparing cotton-seed for the more effectual and easier separation of the oil by means of a press than is accomplished by the common process.

Instead of the common method of roasting the crushed seed with dry heat till it becomes almost like parched coffee before subjecting it to the press, we propose to take the crushed seed and add a sufficient quantity of water, and then stew and boil it until all the pores of the seed are thoroughly open and the fibers of the seed are soft and pliable, then to press the seed in the same manner as it is now done, whereby we gain practically from fifteen to twenty-five per cent. more oil, at the same time using less power to work the press, which is the result of the greater effect that the pressure takes on the softened seed and the more free escape thereby afforded to the oil.

We are aware that it is not new to inject water or steam upon the seed before crushing it; but this renders the crushing more difficult and less perfect, as well as thus prevents a full expression of the oil. We are also aware that the meal has been moistened previous to expressing the oil; but we are not aware that any one has boiled the meal in water so as to disintegrate the oil and fiber and cause a complete separation under pressure; hence

What we claim is—

A process of obtaining oil from cotton or other seeds, which consists in first grinding or crushing the seed, then boiling the meal in water until the the fiber is softened and the pores opened, and then expressing the oil, as described.

SAMUEL SCHEIBLER.
ADOLF SCHEIBLER.

Witnesses:
R. P. WARING, Jr.,
S. M. STEWART.